Feb. 28, 1967   S. C. HETH ETAL   3,306,370
TURF GROOMER WITH ADJUSTABLE TURF-ENGAGING IMPLEMENTS
Filed May 27, 1964   3 Sheets-Sheet 1
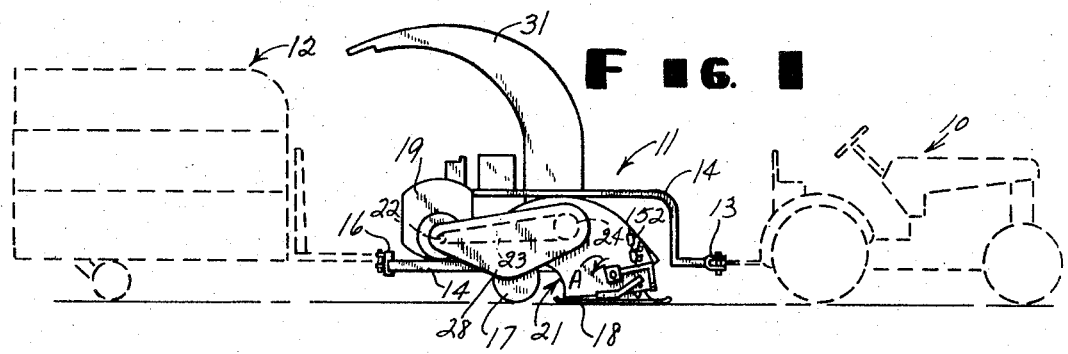
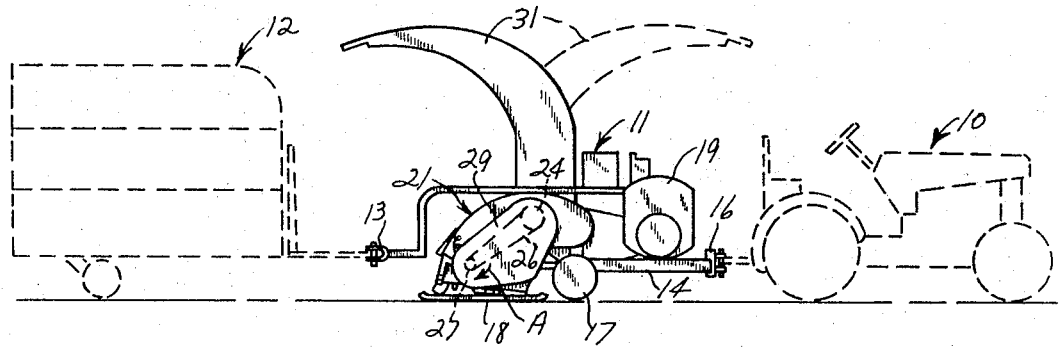
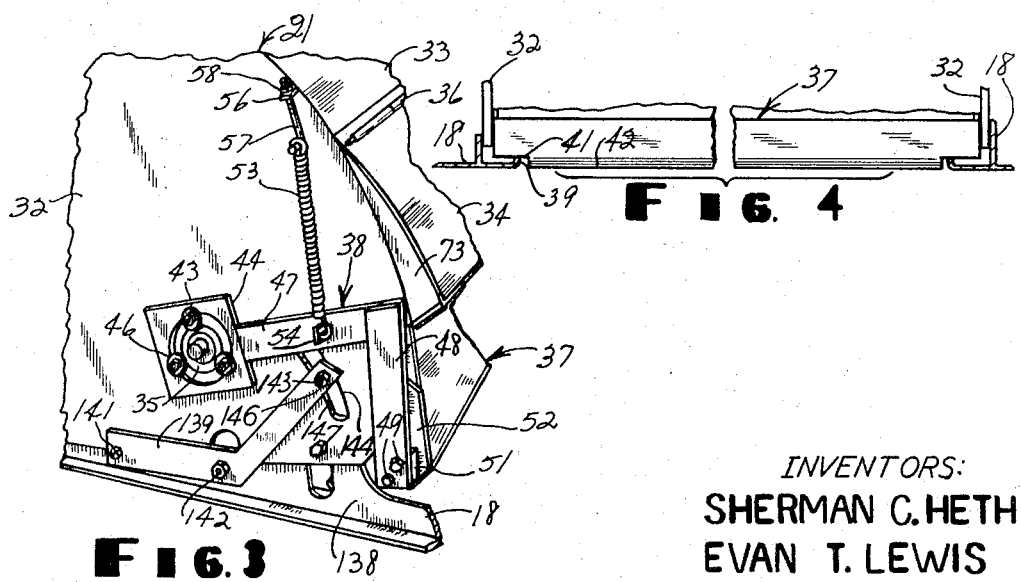
INVENTORS:
SHERMAN C. HETH
EVAN T. LEWIS
BY: Arthur J. Hansmann
ATTORNEY

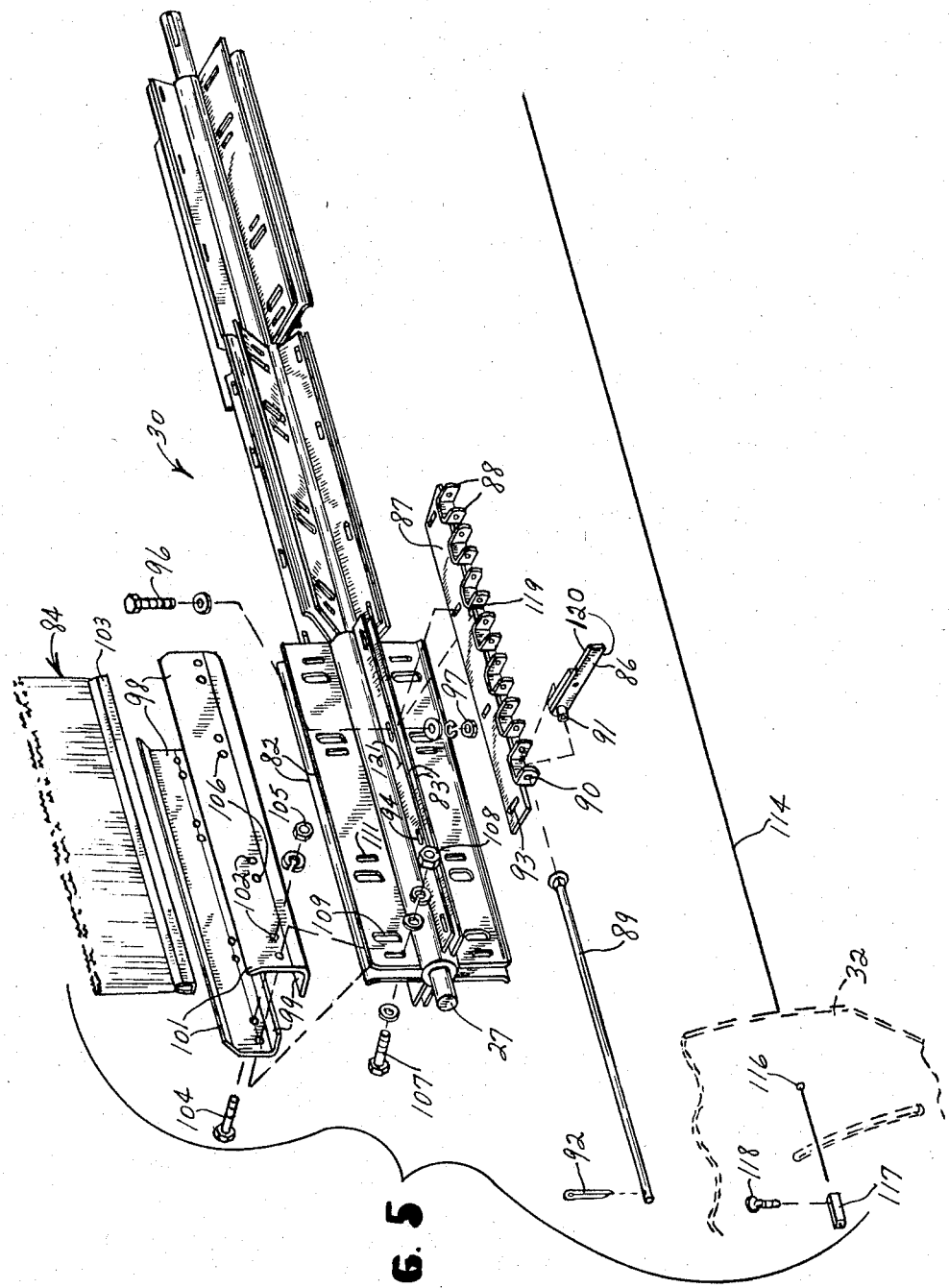

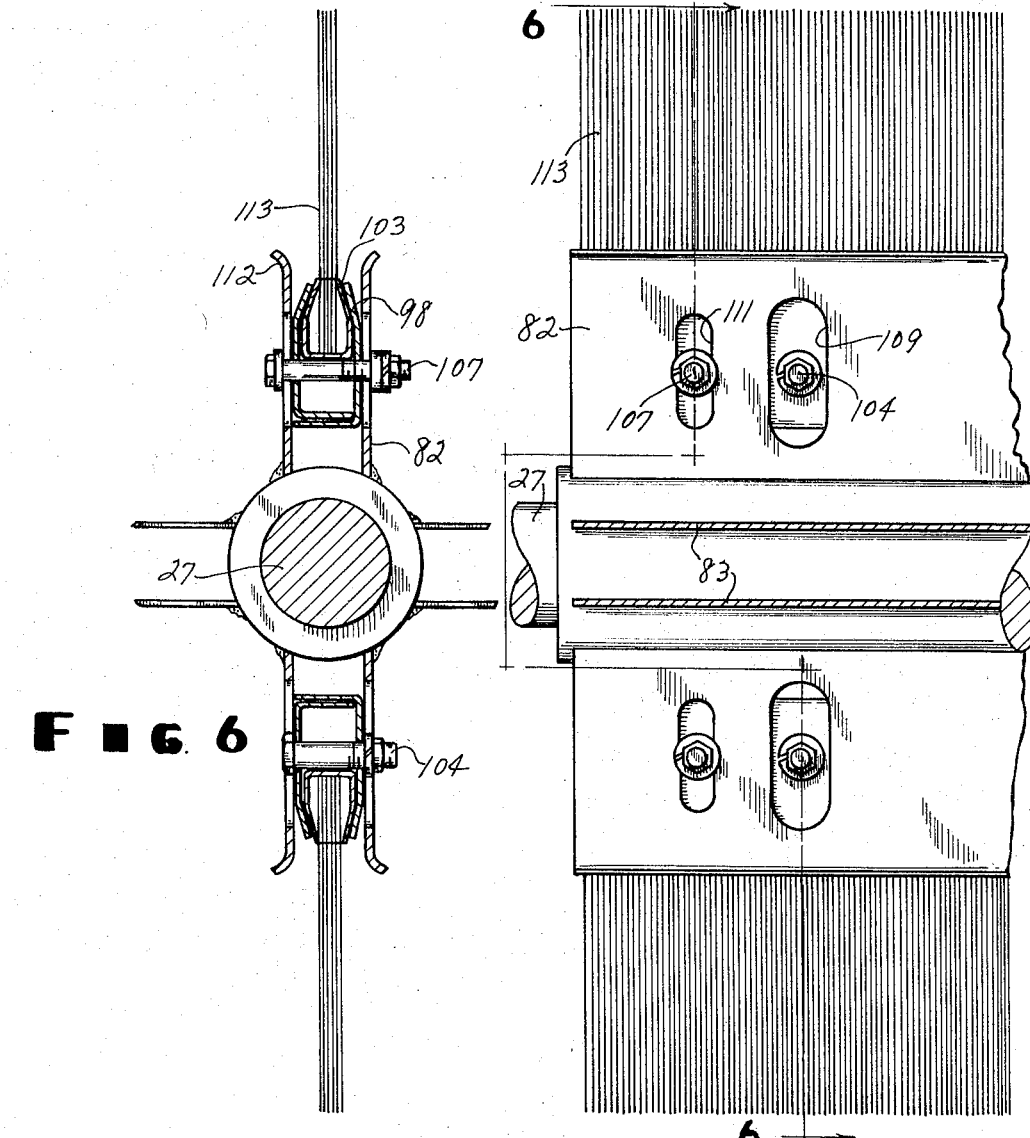
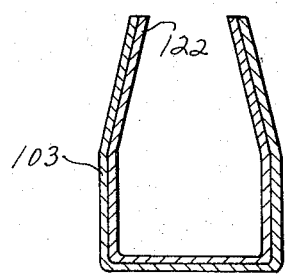
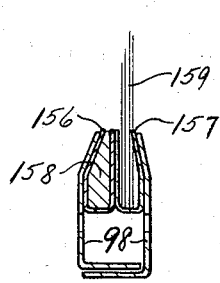

United States Patent Office 3,306,370
Patented Feb. 28, 1967

3,306,370
TURF GROOMER WITH ADJUSTABLE
TURF-ENGAGING IMPLEMENTS
Sherman C. Heth and Evan T. Lewis, both of Racine,
Wis., assignors to Jacobsen Manufacturing Company,
Racine, Wis., a corporation of Wisconsin
Filed May 27, 1964, Ser. No. 370,449
5 Claims. (Cl. 172—519)

This invention relates to a lawn working machine, and more particularly it relates to the rotor for a machine for the dual purpose of lawn thatching and the pickup of material such as grass, leaves, debris and the like.

Lawn thatching and pickup machines are generally known, and one disclosure thereof is shown in U.S. Patent No. 3,112,593. These machines generally consist of a frame and housing unit for traversing the ground and having a rotor which has ground engaging implements for the dual function of cutting the turf and picking up the grass clippings, leaves, and debris which are loosened by the blades and brushes serving as the ground engaging implements. Thus, with a single machine, a lawn can now be thatched and raked to condition the lawn in a beneficial and yet speedy and efficient manner.

It is therefore now recognized that good lawn care requires the thatching of the lawn wherein the grass shoots and stolons at the soil surface should be cut, and also the soil itself should be aerated, also entwined grass roots should be cut in the soil, and dead grass clippings should be removed from the soil surface. The aforementioned conditions are conducive to the development of fungus and the stifling of full and complete growth of the lawn as well as an unsightly appearance of the lawn at least with respect to the portion thereof which is visible above the ground line. Still further the purpose is to remove leaves and fresh grass clippings and any and all debris from the lawn so that again the grass itself has the best conditions for development and growth. Also, unless the lawn is conditioned as mentioned, air, moisture, and even fertilizers are stopped at the surface and do not give the turf the needed elements for healthy growth.

Accordingly, it is a general object of this invention to provide an improved machine for the dual purpose of lawn thatching and the pickup of leaves, grass clippings, debris and other material on the lawn.

A more specific object of this invention is to provide a rotor which will accomplish the aforementioned services and which is specially arranged with brushes and blades for the functions of thatching and of picking up material.

Still another object of this invention is to provide a thatching machine which will perform the thatching function with a minimum of disturbance to the entire lawn and the subsoil, but which will of course yet adequately thatch the soil and the grass as desired. In the specific accomplishment of this object, it is to be hereinafter more fully appreciated that the rotor of the machine is adjustable so that the thatching blades come out of the soil in a line where the soil has already been cut.

Still a further object of this invention is to provide a lawn working machine which is provided with implements for engaging the lawn and wherein the implements are adjustable in their mounting on the machine for selective pressure and depth of lawn engagement, and wherein the entire machine is vertically adjustable for selective contacting of the lawn by the implements. In this particular object the individual implements are therefore adjustably extendable for lawn contact, and also the entire sets of implements are vertically adjustable for selective contact with the lawn as a unit. Also, the brushes can be arranged with light or heavy bristles for corresponding brushing.

Other objects and advantages become apparent upon reading the following description in light of the accompanying drawings, wherein:

FIG. 1 is a side view of a preferred embodiment of this invention and showing a tractor and a wagon in dotted lines.

FIG. 2 is a view of that shown in FIG. 1 but shown from the side opposite thereto, and with the spout also shown in dotted lines.

FIG. 3 is an enlarged perspective view of a fragment of that shown in FIG. 1 with parts removed, and other parts added.

FIG. 4 is a front elevational view of that shown in FIG. 3 and showing a fragment thereof and parts broken away, removed, and added.

FIG. 5 is an exploded view of the rotor of the machine and showing a side of the machine in dotted lines and showing a gauge wire.

FIG. 6 is a sectional view transverse to the rotor shown in FIG. 5 and being enlarged therefrom and having parts broken away and added, and with the section being taken on the line 6—6 of FIG. 7.

FIG. 7 is a side elevational view of that shown in FIG. 6.

FIGS. 8 and 9 are sectional views of modifications shown in FIG. 6.

FIGS. 1 and 2 show a tractor in dotted lines and generally designated 10, the machine of this invention is shown in solid lines and generally designated 11, and a trailing wagon is shown in dotted lines and generally designated 12. Immediately, it will be noted that the machine 11 has one hitch 13 at one end of its frame 14, and it has another hitch 16 at the other end of its frame 14. Therefore it will be understood that the frame includes the members designated 14, and a wheel 17 and other ground engaging members in the form of skids 18 movably support the machine along a line of direction or the longitudinal axis of the machine in, of course, the direction of the movement of the tractor 10. The machine further includes the engine 19 and the support member or housing 21, both of which are suitably supported on the frame 14 in any manner known to one skilled in the art.

Further the machine 11 generally includes the engine shaft designated 22 and the drive belt 23 extending from the shaft 22 to an auger located at 24. FIG. 2 shows that the opposite side of the machine has another belt 26 which extends from the auger down to a shaft designated 27 which is the rotor shaft shown in FIGS. 5 and 6. Thus the engine 19 drives the auger 24 and the rotor shaft 27 with the latter being driven in the direction of the arrow indicated A. A suitable housing 28 encloses the drive means 23 on one side of the machine, and a suitable housing 29 encloses the drive means 26 on the other side of the housing 21 and machine 11. Also a spout 31 is swivelly mounted on the top of the machine 11 as a part thereof, and the spout can swivel in a complete circle to be directed in both the solid line position and the dotted line position in FIG. 2.

Therefore it will be understood that the machine is powered by an engine to have a rotor 30 rotate in one direction only while the machine is towed over the ground by the tractor 10. Thus the rotor operates on the turf for the purpose of thatching or material pickup in a manner described hereinafter.

The housing 21 is an air hood, which is rockably supported, and it includes the side walls 32 and the transverse wall 33. The latter has a cover 34 attached thereto by means of a hinge 36 so that the cover can of course be raised from the position shown, and the housing interior is then accessible for adjustment and the like with respect to the rotor 30. Thus, the walls 32 and 33 extend down toward the ground, and the cover 34 is spaced further above the ground, and the space is occupied by a baffle generally designated 37 and supported on the housing 21 by means of the adjusting mechanism generally designated 38. Also, ground engaging members in the form of the skids 18 are mounted on the housing 21, and FIG. 4 particularly shows that the baffle 37 rests downwardly on the skids 18, and this is the thatching position of the machine. Thus the skid end 39 is disposed toward the interior of the machine, and the baffle 37 has a notch 41 which receives the skid end 39 and permits the baffle lower surface 42 to depend to the ground line to slide along the ground in the operation of the machine.

The member 38 supports the baffle 37 by being rotatably mounted through a collar 35 on each side of the housing 21 by means of the bolts 43. The plate 44 is thus rotatable adjacent the wall 32 by the washers 46 which slidably secure the plate 44 to the wall 32. A first arm 47 extends from the plate 44 to a second arm 48 which extends downwardly and connects to the baffle 37 by means of the two bolts 49 as shown. A block 51 suitably extends between the arm 48 and the side 52 of the baffle 37. Accordingly, the baffle 37 is vertically adjustably mounted for the floating action on the housing 21. Also a counter-balancing spring 53 is connected to a bracket 54 on the arm 47 and a bracket 56 on the housing 21. Thus the counter-weight spring 53 has a rod 57 which is adjustable on the bracket 56 by means of the nut 58 so that the pressure of the spring 53 can be adequately controlled for supporting the part of the weight of the assembly of elements 37 and 38 as described. A block 73 is attached to the housing side wall 32, and the block 73 supports the cover 34.

FIG. 5 shows the rotor with the shaft 27 extending therethrough. Pairs of plates 82 and 83 are suitably attached to the shaft 27 by welding or the like to extend radially therefrom in diametrically opposite pairs as shown. It will also be noted that the plates 82 and 83 are radially offset in three groups along the length of the shaft 27 and thus the load on the shaft and the rotor as a whole is distributed therealong.

Thus a plurality of brushes, such as the brush 84, and a plurality of knives or blades, such as the blade 86, are radially extended on the rotor. Of course it will be understood that the blades 86 exist in a set on the support plate 87 which secures a plurality of U-shaped members 88 suitably attached to the plate 87. Also a bolt 89 extends through openings 90 in the members 88 and openings 91 in the blades 86 to thereby secure the blades to the members 88. A cotter pin 92 is employed for securing the bolt or shaft 89 with respect to the members 88 and therefore the shaft 89 can be readily withdrawn from the members 88 and any one or all of the blades can be removed. It will also be noted that the plate 87 has radially elongated slots 93 extending therethrough and these slots align with axially elongated slots 94 in the two members 83 on the shaft 27. Finally, bolts 96 and nuts 97 secure the plates 87 to the plates 83. With this arrangement it will therefore be noted that the connection between the blades 86 and the shaft 27 is such that the blades can be adjustably positioned both axially and radially with respect to the shaft 27.

The brushes 84 are secured to the shaft 27 by means of the clamping plates 98 which have inturned ends 99 on the radially inner edges thereof and inturned ends 101 on the radially outer edges thereof. Also a set of bolt holes 102 is provided in each of the plates 98, and the plates flank the brush 84 and particularly the brush crimping strip 103. Thus the brushes 84 are of course clamped by the plates 98 when the bolts 104 with nuts 105 are tightened on the plates 98.

FIG. 6 shows the assembled arrangement of the parts described.

Also, the subassembly described is disposed between the attaching means or plates 82, and a second set of bolt holes 106 is disposed in the plates 98 to receive bolts 107 which are secured by the nuts 108 to bolt the brush assembly to the plates 82. Of course in both instances of bolting, radially elongated slots 109 and 111 exist in both of the plates 82 for reception of the bolts 104 and 107, respectively. Again FIGS. 6 and 7 show the assembled arrangement of the brush parts described. Also it will be noted that the outer edges 112 of the plate 82 are turned outwardly away from the brush so as not to interfere with the brushing action of the brush when the latter is normally displaced in its brushing action, but the edges 112 are available for supporting the bristles 113 of the brushes 84 if needed. The brush subassembly with the brush 84 and the plates 98 is radially adjustably moveable with respect to the shaft 27.

FIG. 5 further shows a gauge wire or the like extends through an opening 116 in the side wall 32 and is secured thereto by a block 117 and a wing screw 118. The gauge wire 114 is therefore stretched between the two sides 32 of the housing 21 and provides the alignment guide for the radial projection of the brushes 84 and the blades 86 so that they can be both aligned radially to the same extent or they can of course be disposed radially to an extent desired since the blades and the brushes are independently radially adjustable.

Also, the blade plate 87 has a gauge mark indicated 119 and plate 83 has a gauge mark indicated 121, and these marks are used for axial alignment of the blade plate 87 with respect to the shaft 27. Therefore the individual blades 86 on diametrically opposite sides of the shaft 27 can be placed in the same axial alignment so that each blade operates in the same transverse plane with respect to the rotor and they therefore operate in the same line of cut as desired. Thus, upon advance of the machine to the left in FIG. 2 for thatching, the blades 86 are rotated to enter uncut soil but to come out of the soil where there is a cut, and cutting edge 120 is shown. This feature avoids tearing of the turf since the blades are not leaving the turf where it has not already been cut.

The material picked up and displaced by the rotor is impinged against the baffle 37 to place the material in an air stream. FIGS. 3 and 4 show the support of the baffle 37, and they also show the housing sides 32 disposed intermediate the upright position 138, on the skid 18, and the ends of the baffle 37. Therefore the skid portions 138 serve to seal off the sides of the machine as they extend beyond the lower edges of the housing walls 32 and down to the ground to provide the air tight construction so that upward air flow can be accomplished.

The housing 21 is vertically adjustably supported on the skids 18 by means of the adjustable connector 139 which is pivotally mounted on the housing wall 32 by the bolt 141. Thus the member 139 is also attached to the skid 18 by the bolt 142 and it is adjustably attached to the housing wall 32 by the bolt 143. Still further, a scale 147 is disposed on the wall 32 adjacent the arcuate opening 144, and it will therefore be understood that upon loosening the nut 146 the member 139 can be pivoted about the bolt 141 to an adjusted position with respect to the slot 144. In this adjustment, the bolt 142 raises or lowers the skid 18 as desired. The bolt 142 of course also connects to the skid 18 as well as to member 139.

In the FIG. 1 position, the machine is in the leaf and material pickup position, and in this position the baffle 37 is supported upwardly by means of a chain 152 which is secured to the housing 21 and depends therefrom to hook onto the member 38 and maintain the baffle 37 upwardly as mentioned. Therefore the machine does not have the baffle 37 riding on the material to be picked up, but instead the baffle 37 is raised to just a height to clear the material, such as leaves, and thus the brushes can adequately engage and pick up the material. It is significant to note that in the FIG. 1 position the rotor is rotating in the direction of the arrow indicated "A" and therefore the brushes are sweeping up under the material and directing it toward the raised baffle 37 and into the air stream as mentioned.

FIGS. 8 and 9 show modifications of the brush which can fit into the support member or holder including the plates 112 of FIG. 6. Thus it will be noted that the brush stripping like 103 in FIG. 8 has a similarly shaped but smaller stripping 122 nested therein, and the stripping 122 would of course extend through the length of the stripping 103 and would contain the bristles 113. In this manner, a lighter brush including its stripping 122 can be readily mounted in the brush holder simply by slipping and telescoping the larger stripping 103 over the brush stripping 122 and disposing both strippings in the holder. It is therefore to be understood that many lawn conditions are such that light brushing is necessary and therefore the lighter brush can be readily inserted in the same basic mounting as well as of course the insertion of the heavier brush with its stripping 103 and its more numerous bristles 113 compared to the lesser number of bristles which would be in the brush having the stripping 122.

FIG. 9 also shows a manner in which a lighter brush can be inserted into the same basic mounting but here it will be noted that the plates 98 flank two smaller brush crimping strips 156 and 157 which are disposed next to each other within the plates 98. The strip 156 simply has a dummy center 158 while the strip 157 has bristles 159. Accordingly, in this manner the brush consisting of the strip 157 and its bristles 159 can be disposed within the brush mounting to substitute for the heavier brush as for instance as shown in FIG. 6. Therefore the two strips 156 and 157 occupy the same space as the single brush strip 103 occupies in FIG. 6 and therefore the two can be substituted for the one and interchanged between the light and heavy brushes as desired.

While certain embodiments of the brush and brush mounting have been shown and described in conjunction with the entire machine in which there is a combination invention, it should be obvious that certain changes can be made in the brush elements and the overall combination of the mounting and the machine itself, and therefore the scope of this invention should be determined by the appended claims.

What is claimed is:

1. A radially adjustable brush mounting for a lawn sweeping machine, comprising a rotor including radially extending spaced-apart mounting plates having radially extending slots spaced therealong, a brush including an elongated backing strip having a back edge, L-shaped clamping plates reversely nested together and flanking said backing strip and extending beyond said back edge and having two sets of bolt holes in the extending portion with one set aligned with said slots in said mounting plates and with the other set aligned with said back edge of said backing strip, bolts in said other set of said bolt holes and in contact with said back edge of said backing strip to align the latter radially and secure said clamping plates together, the thickness across said clamping plates being similar to the spacing between said mounting plates for radially slidable snug reception of said clamping plates, and bolts extending through said slots and said one set of said bolt holes and being radially slidable along said slots for radially adjustably securing said brush on said rotor.

2. A radially adjustable brush mounting for a lawn sweeping machine capable of receiving two sizes of brushes, comprising a rotor including radially extending spaced-apart mounting plates having radially extending slots spaced therealong, a brush including bristles and an elongated backing strip of a selected thickness, clamping plates flanking said backing strip and being attached thereto on opposite sides of the thickness thereof and extending therebeyond and having bolt holes in the extending portion aligned with said slots in said mounting plates, the distance across said clamping plates being equal to the spacing between said mounting plates for radially slidable snug reception of said clamping plates, bolts extending through said slots and said bolt holes and being radially slidable along said slots for radially adjustably securing said brush on said rotor, said backing strip being U-shaped in cross section and adapted for telescoping in pairs with a total thickness equal to said selected thickness for substitution of said pair for one of said brushes, the radially extending ends of mounting plates being curved away from each other and disposed radially beyond said backing strips for contacting said bristles and thereby limiting the deflection of said bristles during sweeping.

3. A rotor for a ground-engaging lawn thatching and sweeping machine including four mounting means spaced around said rotor, two sets of blades and two brushes operatively connected to respective ones of said mounting means in alternate relation around said rotor, said blades having cutting edges arranged and disposed for cutting movement in planes transverse to the axis of said rotor, a plate for each of said sets of blades by which said blades are pivotally supported and providing the connection between said mounting means and said blades, said plates having slots extending axially of said rotor for adjusting the positions of said sets of blades axially of said rotor to align corresponding ones of said blades between said sets thereof in said transverse planes for cutting the ground in a single line of cut by every two corresponding ones of said blades in thatching, the connections between said mounting means and said brushes and said blades having slots for adjusting the radial positions of said brushes and said blades with respect to said rotor, and bolt means included in said connections for securing said blades and said brushes on said mounting means.

4. The subject matter of claim 3, including a housing for rotatably supporting said rotor, a cable operatively connected to said housing and extending parallel to the axis of said rotor and through the length of said rotor in a position for guiding radial adjustment of both said blades and said brushes.

5. The subject matter of claim 4, including alignment marks on said mounting means and said plates for indicating axial positioning of said plates on said mounting means.

References Cited by the Examiner

UNITED STATES PATENTS

| 992,017 | 5/1911 | Lowe | 172—550 |
|---------|--------|------|---------|
| 1,767,686 | 6/1930 | Litchfield | 275—3 |
| 2,506,054 | 5/1950 | Agee et al. | 56—121.4 |
| 2,721,348 | 10/1955 | Blydenburgh | 15—183 |
| 2,990,019 | 6/1961 | Finn | 56—24 X |
| 3,023,440 | 3/1962 | Peabody et al. | 15—183 |
| 3,112,593 | 12/1963 | Ronning | 56—27 X |

FOREIGN PATENTS 790,826   2/1958   Great Britain.

ABRAHAM G. STONE, *Primary Examiner.*

J. R. OAKS, *Assistant Examiner.*